US009734475B2

(12) United States Patent
Tang et al.

(10) Patent No.: US 9,734,475 B2
(45) Date of Patent: Aug. 15, 2017

(54) SLAB MATCHING METHOD FOR MULTIPLE HOT ROLLING LINES TO IMPROVE MATERIAL RESOURCE UTILIZATION OF A STEEL PLANT

(71) Applicant: NORTHEASTERN UNIVERSITY, Shenyang (CN)

(72) Inventors: Lixin Tang, Shenyang (CN); Ying Meng, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 14/582,050

(22) Filed: Dec. 23, 2014

(65) Prior Publication Data

US 2016/0125336 A1 May 5, 2016

(30) Foreign Application Priority Data

Oct. 31, 2014 (CN) .......................... 2014 1 0606180

(51) Int. Cl.
*G06Q 10/00* (2012.01)
*G06Q 10/06* (2012.01)

(52) U.S. Cl.
CPC ........ *G06Q 10/06313* (2013.01); Y02P 80/40 (2015.11)

(58) Field of Classification Search
CPC .............................................. G06Q 10/06313
USPC ............................................... 705/7.24, 7.12
See application file for complete search history.

(56) References Cited

U.S. PATENT DOCUMENTS

| 2,566,767 | A | * | 9/1951 | Hunt | .................... | G01R 31/013 |
| | | | | | | 209/570 |
| 6,044,361 | A | * | 3/2000 | Kalagnanam | .......... | G06Q 10/04 |
| | | | | | | 705/28 |
| 6,321,132 | B1 | | 11/2001 | Dawande et al. | | |
| 2006/0100727 | A1 | * | 5/2006 | Dash | ................ | G05B 19/41865 |
| | | | | | | 700/97 |

(Continued)

OTHER PUBLICATIONS

Tang, Lixin, Jiyin Liu, Aiying Rong, and Zihou Yang. "A review of planning and scheduling systems and methods for integrated steel production." European Journal of Operational Research 133, No. 1 (2001): 1-20.*

(Continued)

*Primary Examiner* — Jonathan G Sterrett
*Assistant Examiner* — Mehmet Yesildag

(57) ABSTRACT

Slab matching method for multiple hot rolling lines comprises grouping the slabs and orders to obtain slab-order groups; based on a criterion of slab-order specification matching, determining a matching condition between the slab and the order within each of slab-order groups; quantitatively describing a mis-order slab matching problem; matching the mis-order slabs to the orders; quantitatively describing a slab re-matching problem; adjusting the matching relationships of all the slabs and the orders to form a final scheme of slab matching to be distributed to the multiple hot rolling lines to execute, and the slab matching method is completed. The present invention improves the utilization of the mis-order slabs while reducing the waste of energy caused by repeated steelmaking, reducing the consumption of the material and lowers the amount of left material and stored material and saves production cost and storage cost for the plant.

2 Claims, 3 Drawing Sheets

(56) References Cited

U.S. PATENT DOCUMENTS

2006/0143030 A1* 6/2006 Wertheimer ........... G06Q 10/04
700/99
2013/0268249 A1* 10/2013 Tang ...................... G06Q 10/08
703/2

OTHER PUBLICATIONS

Tang, Lixin, and Huizhi Ren. "Modelling and a segmented dynamic programming-based heuristic approach for the slab stack shuffling problem." Computers & Operations Research 37, No. 2 (2010): 368-375.*

Tang, Lixin, Jiyin Liu, Aiying Rong, and Zihou Yang. "An effective heuristic algorithm to minimise stack shuffles in selecting steel slabs from the slab yard for heating and rolling." Journal of the Operational Research Society 52, No. 10 (2001): 1091-1097.*

Tang, Lixin, Jiyin Liu, Aiying Rong, and Zihou Yang. "Modelling and a genetic algorithm solution for the slab stack shuffling problem when implementing steel rolling schedules." International Journal of Production Research 40, No. 7 (2002): 1583-1595.*

* cited by examiner

SLAB MATCHING METHOD FOR MULTIPLE HOT ROLLING LINES TO IMPROVE MATERIAL RESOURCE UTILIZATION OF A STEEL PLANT

TECHNICAL FIELD OF THE INVENTION

The present invention relates to the technical field of automation, and particularly to slab matching method for multiple hot rolling lines to improve material resource utilization of a steel plant.

BACKGROUND OF THE INVENTION

As a basic industry of raw material, the steel industry has a strategic significance for the overall economy. As the competition increases in the market of steel, the demand for steel product is transformed from one single type of large batch to diversified types of small batches. However, this transformation may bring challenges to the steel plant. It is important to reduce the consumption of the resource and the production cost for slab production, while satisfying demands for diversified types of small batches.

As large equipment of high energy consumption, the steelmaking converter and the electric furnace have a high cost for startup and operation, and the capacity of the steelmaking line must be fully exploited for the steelmaking is a bottleneck process for overall capacity of the steel production. In order to gain a big share in the steel market, a steel plant must satisfy the diversified demands on the market, that lead to some differences of requirements in the intermediate order (the hot-rolled slab) or the final order (the hot-rolled strip steel) in terms of the steel grade, the specifications, the physical characteristics, the date of delivery, etc, and these differences will directly affect the charge plan for steelmaking, that is the batching of orders for each charge. As the market demand for steel tends to be diversified types of small batches, the total weight of slabs in the same charge plan is often lower than the minimum production amount required by steelmaking operation, which leaves over a lot of mis-order slabs. Besides, if the client's order is cancelled but the production for this order has started, mis-order slabs are also produced. Here, the mis-order slab means the slab which does not belong to any client's order. The generation of mis-order slabs significantly increases the inventory of slab yard. If these mis-order slabs are not fully utilized, it may also lead to resource waste caused by repeated steelmaking, the delayed delivery, large cut-loss and low hot charging rate, and hence, it not only increases the production cost and lowers customer's satisfaction, but also increases energy and resource consumption, increases the $CO_2$ emissions, and increases the environment pollution. In order to overcome these drawbacks, the planners need to allocate the mis-order slabs to the orders that are unfulfilled by slabs, that is the mis-order slab matching plan.

Besides, sometimes the slabs and the orders need to be re-matched, i.e., the re-matching the slabs to orders, due to variation of the organization of the plant or the client's requirement, such as: (1) when the continuous caster is producing the slabs, due to adjustment of the width of the slabs, the specification of the transition slabs, which connect two slabs with different width, might not meet the requirement of the order, or the quality of the transition slabs, which connect two slabs with different steel grades, might not meet the requirement of the order due to casting of dissimilar steel grades (usually between steel grades close to each other), thus causing the undesired matching between the slabs and the orders; (2) some urgent orders (which have a urgent date of delivery) might lack slabs due to waste material of the post-process, and it is necessary to adjust the matching between the slabs and the orders to guarantee that the urgent orders can be delivered in time; (3) if the client's requirement for the steel grade, size and weight is varied, obviously the produced slabs according to original requirement cannot meet the changed requirement.

The slab matching plan includes mis-order slab matching plan and slab re-matching plan. Most steel plants have multiple hot rolling lines, the specification of slabs required by these lines might overlap in some extent. Due to the huge amount of data and complicatedness of the problems, planners usually consider the respective lines separately when making the mis-order slab matching plan and slab re-matching plan, but in the view of the overall process of hot rolling, such a scheme is not global optimal. Making mis-slab matching plan and slab re-matching plan for all the hot rolling lines simultaneously can effectively enlarge the optimal space, and hence reduce the production cost and the material consumption, improve the material resource utilization, and increase the profit and competitiveness of the plant.

Currently, in the steel plant, the mis-order slab matching and the slab re-matching plans are still made in a totally manual way. Most of the planners make the plans according to the table in an written form, and only a few of the planners do this job on an ERP information platform; but this ERP information platform still only provides information about data and cannot do the work of automatic optimization, and the planning is still based on personal experience and some simple rules. When facing the huge amount of information about data and the complicatedness of the matching rules, it is difficult for the planners to make an efficient scheme accurately and timely, which causes an undesired and un-optimal matching, thus resulting in low utilization of the slabs, high consumption of resource, high inventory level of slab yard, and delayed delivery of orders etc. Therefore, there is an urgent need for an optimization solution for the steel plant to solve the abovementioned problems efficiently and timely to reduce the production cost and inventory cost, reduce the resource and energy consumption, shorten the production cycle, and improve the capability of timely delivery.

Some patents and papers give their solutions on these problems. Tang et. al., (L. X. Tang, J. X. Luo, J. Y. Liu, Modelling and a Tabu Search Solution for the Slab Reallocation Problem in Steel Industry) and the U.S. Pat. No. 8,942,961 B2, titled "Re-matching method of slab-order for improving slab utilization in iron and steel plants" only discuss two types of method of slab re-matching for single production line, and gives solutions for different intelligent algorithms. In their problem, the mis-order slab matching scheme decision has already been given.

Vasko, et. al. (F. J. Vasko, M. L. Cregger, K. L. Stott, L. R>Woodyatt. Assigning slabs to orders: An example of appropriate model formulation. Computer & Industrial Engineering. 1994. 26: 797-800) and Tang Lixin, et. al., only discuss a matching method for slabs for single production line in the U.S. patent application Ser. No. 13/679,954, titled "Model and device for assigning surplus slabs in the slab yard before hot rolling process". Therein, Vasko, et. al. study a slab matching method for slabs that can be cut with the objective of minimizing the cut loss of the slabs, while Tang Lixin, et. al., study a surplus slab matching method for slabs that cannot be cut aiming at multiple practical objectives including minimization of the cut loss of the slabs. They all did not give how to make re-matching plan for slabs and orders when the production variation occurs.

However, all these discussions are with respect to either the matching of left slabs or the re-matching of slabs for single production line, and do not consider the mis-order slab matching decision and slab re-matching decision simultaneously, do not involve the matching for multiple lines, and haven't take the position of the storage area, time in storage and the logistic expenses into consideration. Secondly, these discussions treat the slab matching and re-matching separately. The present invention considers the slab matching and the re-matching integrally to achieve the global optimization.

SUMMARY OF THE INVENTION

With respect to the problems existing in the prior art, the present invention provides slab matching method for multiple hot rolling lines of a steel plant to improve the material resource utilization.

The technical solution of the present invention is as follows:

Slab matching method for multiple hot rolling lines of a steel plant to improve material resource utilization, comprising the following steps:

step 1: grouping the slabs and orders based on steel grades to obtain slab-order groups;

wherein the slabs comprise all the mis-order slabs and the slabs already matched to the orders;

step 1.1: grouping steel grades according to better-substituting-relation (BSR) of steel grades: first, selecting a steel grade randomly, combining the steel grade with the steel grades having a BSR therewith into one steel grade group, and if there is no BSR between the steel grade and the other steel grades, then taking the steel grade solely as one steel grade group; comparing ungrouped steel grades with all the formed steel grade groups in a random order, and if there is a BSR between an ungrouped steel grade and the steel grades in a certain steel grade group, then adding the ungrouped steel grade into the certain steel grade group, otherwise taking the ungrouped steel grade solely as one steel grade group until all steel grades are assigned into steel grade groups;

wherein the better-substituting-relation (BSR) of steel grades means that when matching the slabs, a steel grade can be substituted with another steel grade;

step 1.2: if the steel grade of a slab and the steel grade required by an order belong to a same steel grade group, then assigning the slab and the order into the steel grade group;

All slabs and orders which belong to the same steel grade group form the slab-order group.

step 2: Based on a criterion of specification matching of slab and order, determining a matching condition between the slabs and the orders within each of slab-order groups, i.e., determining whether a given slab can be allocated to a given order, and if the slab and the order in the slab-order group satisfy the criterion, then the slab and the order can be matched and can constitute a slab-order pair, otherwise, the slab and the contract cannot be matched;

wherein the criterion of specification matching of slab and order is as follows:

1) when the steel grade of a slab is the same as the steel grade required by an order or there exists a BSR between the steel grade of the slab and the steel grade required by the order, it is considered that the steel grade of the slab matches the steel grade of the order;

2) when the width of a slab falls in the width range of the slab required by an order, it is considered that the width of the slab matches the width of the order;

3) when the weight of a slab falls in the weight range of the slab required by an order, it is considered that the weight of the slab matches the weight of the order;

4) when the length of a slab falls in the length range of the slab required by an order, it is considered that the length of the slab matches the length of the order; and 5) each order has a specified hot-rolling production line, the slab allocated to the order needs to be subject to a coiling operation in a coiler specified by the order, the weight of the slab cannot exceed a weight limit of the coiler, and when the weight of the slab is less than the weight limit of the coiler specified by the order, it is considered that the weight of the slab matches a limit weight of the order;

step 3: quantitatively describing a mis-order slab matching problem;

step 3.1: selecting a decision variable $x_{kijl}$ for mis-order slab matching;

the decision variable $x_{kijl}$ represents a matching relationship between a slab i located in a slab yard k and an order j needed to be processed on hot rolling line l, wherein when the slab i in the slab yard k is allocated to the order j of the hot rolling line l, the variable is assigned a value of 1; otherwise it is assigned a value of 0;

step 3.2: quantitatively describing the object for mis-order slab matching;

the object for slab matching comprises: minimizing the matching cost caused by the difference between the specification of the slab and the specification required by its allocated order, minimizing the cost caused by unallocated slabs, maximizing the priority profits of the slab and the order, and minimizing the cost caused by unfulfilled order;

wherein 1) minimizing the matching cost caused by the difference between the specification of the slab and the specification required by its allocated order the matching cost caused by the difference includes: the cost caused by quality difference when allocating a slab with a high quality to an order having a low quality requirement; the cost caused by specification mismatch when the specification of the slab cannot be matched with the specification required by the order; and the logistics cost when matching the slabs to orders of different hot rolling lines;

(2) minimizing the cost caused by unallocated slabs matching the mis-order slabs as much as possible to the unfulfilled orders, reducing the unallocated slabs to improve material resource utilization and reduce the energy consumption due to repeated steelmaking;

(3) maximizing the priority profits of the slab and the order according to the production batches of the orders, the process flow of the orders, the time margin, the status of the order and the class of the order, determining the priority profit of the orders and allocating the slabs to the orders having higher priority profits preferentially; and according to the storage time of the slabs and location in storage of the slabs, determining the priority profit of the slabs and preferentially allocating the slabs having higher priority profits;

(4) minimizing the cost caused by the unfulfilled order

A fulfilled order means that the quantity of the products is just equal to the quantity of products required by the order, without any lack (the total weight of products is lower than the required weight) or over (the total weight of products exceeds the required weight);

step 3.3: quantitatively describing process constraints of a designated scheme of mis-order slab matching:

(1) constraint of production process: each slab is only allowed to be allocated to one order at most;

(2) constraint of the quantity demanded by the order: the weight of the slabs allocated to an order should be within the range of the quantity demanded by the order, and the redundant weight should not exceed the weight of any slab matched to the order;

wherein the redundant weight is equal to the total weight of slabs allocated to the order minus the slab weight required by the order;

step 4: with respect to the information of the mis-order slabs and orders in each of slab-order groups, based on the matching conditions between the slabs and the orders in step 2 and the mis-order slab matching problem quantitatively described in step 3, matching the mis-order slabs to the orders;

step 4.1: creating a set of initial mis-order slab matching schemes including matching schemes having a low matching cost and matching schemes having a good dispersity, the matching scheme having a good dispersity referring to matching schemes having a largest difference from the matching schemes having a low matching cost;

Aiming at minimizing the matching cost caused by the difference between the specification of the slab and the specification required by its allocated order, building the set of initial mis-order slab matching schemes with different greedy heuristic algorithms;

heuristic algorithm 1: using the number of the slabs having a matching condition with the orders and the matching cost caused by the difference between the specification of the slab and the specification required by its allocated order, selecting the slabs and their matched orders, that is, sequencing all the slab-order pairs in an ascending sequence according to the number of slabs having a matching condition with the orders, and sequencing slab-order pairs with the slabs that are correspond to the same order in an ascending sequence according to the matching cost caused by the difference between the specification of the slab and the specification required by its allocated order, and then under the condition of meeting the processing requirements, starting from the first slab-order pair, selecting the slab-order pairs in which the order is unfulfilled, allocating the slab in the slab-order pair to the order in the slab-order pair, and then allocating the left slabs in the same way until all the slabs are examined, that is the matching scheme 1;

heuristic algorithm 2: selecting the slab-order pairs by minimizing the matching cost caused by the difference between the specification of the slab and the specification required by its allocated order, that is sequencing the slab-order pairs in an ascending sequence according to the matching cost caused by the difference between the specification of the slab and the specification required by its allocated order, and starting from the first slab-order pair, under the condition of meeting the processing requirements, allocating the slab in the slab-order pair to the order in the slab-order pair, and then the next until all the slabs are examined, that is the matching scheme 2;

heuristic algorithm 3: selecting the slab-order pairs by utilizing the priorities of the orders, that is sequencing all the slab-order pairs in a descending sequence according to the priorities of the orders, and sequencing the slab-order pairs with the slabs corresponding to a same order in an ascending sequence according to the matching cost caused by the difference between the specification of the slab and the specification required by its allocated order, and starting from the first slab-order pair, under the condition of meeting the processing constraints, allocating the slab in the slab-order pair to the order in the slab-order pair, that is the matching scheme 3;

heuristic algorithm 4: selecting the slab-order pairs by using the priorities of the slabs, that is sequencing all the slab-order pairs in an descending sequence according to the priorities of the slabs, and sequencing slab-order pairs with the orders corresponding to a same slab in an ascending sequence according to the matching cost caused by the difference between the specification of the slab and the specification required by its allocated order, and starting from the first slab-order pair, under the condition of meeting the processing constraints, allocating the slab in the slab-order pair to the order in the slab-order pair, that is the matching scheme 4;

heuristic algorithm 5: selecting the slab-order pairs by minimizing the matching cost caused by the difference between the specification of the slab and the specification required by its allocated order, that is sequencing all the slab-order pairs in an ascending sequence according to the matching cost caused by the difference between the specification of the slab and the specification required by its allocated order, and sequencing the slab-order pairs with a same matching cost in an descending sequence according to the priorities of the orders, and starting from the first slab-order pair, under the condition of meeting the processing constraints, allocating the slab in the slab-order pair to the order in the slab-order pair, that is the matching scheme 5;

heuristic algorithm 6: selecting the slab-order pairs by minimizing the matching cost caused by the difference between the specification of the slab and the specification required by its allocated order, that is sequencing all the slab-order pairs in an ascending sequence according to the matching cost caused by the difference between the specification of the slab and the specification required by its allocated order, and sequencing the slab-order pairs with a same matching cost in a descending sequence according to the priorities of the orders, and starting from the first slab-order pair, under the condition of meeting the processing constraints, allocating the slab in the slab-order pair to the order in the slab-order pair, that is the matching scheme 6;

heuristic algorithm 7: selecting the slab-order pairs by using the priorities of the orders and the priorities of the slabs, that is sequencing all the slab-order pairs in a descending sequence according to the priorities of the orders and sequencing the slab-order pairs with slab of the same priority of order in a descending sequence according to the priorities of the slabs, and starting from the first slab-order pair, under the condition of meeting the processing constraints, allocating the slab in the slab-order pair to the order in the slab-order pair, that is the matching scheme 7;

step 4.2: creating a reference set of matching schemes;

according to the object of step 3.2, selecting N1 matching schemes having a low matching cost and N2 matching schemes having a good dispersity from the set of initial slab matching schemes to constitute a reference set of matching schemes;

step 4.3: determination of a terminating condition: if iterations of step 4.2 reach a terminating iterations, then executing step 4.7, otherwise executing step 4.4;

step 4.4: generating, from the reference set of matching schemes, a subset of matching schemes, i.e., a matching scheme having a low matching cost and any two matching schemes in the reference set of matching schemes constitute a subset of matching schemes;

step 4.5: forming a new matching scheme by combination: recombining the matching schemes in the subset of matching schemes to generate a new matching scheme;

step 4.6: optimizing the new matching scheme by using a method of local search algorithm and new neighborhood: exchanging the matching relationships between some slabs in the matching scheme to improve of the new matching scheme;

step 4.7: updating the reference set of matching schemes: if the matching cost of the new matching scheme is lower than a matching scheme in the reference set of matching schemes, then using the new matching scheme to replace the original matching scheme in the reference set and executing step 4.4; otherwise, if no new matching scheme is generated, then regenerating N2 new matching schemes having a good dispersity and adding thereto N1 matching schemes having a low matching cost in the original reference set of matching schemes to serve as the set of initial matching schemes, and turning to step 4.2; if it is unable to generate a new matching scheme required by the set of initial matching schemes, then executing step 4.8;

step 4.8: allocating the mis-order slabs to the orders based on the matching scheme having a minimum matching cost in the updated reference set of matching schemes;

step 5: quantitatively describing a slab re-matching problem;

step 5.1: selecting a decision variable $x_{kijl}$ describing a matching relationship between a slab and an order, which represents a matching relationship between a slab i located in a slab yard k and an order j needed to be processed on a production line l, wherein when the slab i in the slab yard k is allocated to the order j of the hot rolling line l, the decision variable is assigned a value of 1; otherwise it is assigned a value of 0;

step 5.2: quantitatively describing an object for the slab re-matching comprising minimizing a matching cost caused by the difference between the specification of the slab and the specification required by its allocated order, maximizing the priority of order, minimizing the cost caused by unfulfilled order and minimizing the overload of equipment unit;

wherein minimizing a matching cost caused by the difference between the specification of the slab and the specification required by its allocated order means minimizing a matching cost caused by the quality difference, minimizing a matching cost caused by the specification difference, minimizing the logistics cost and minimizing the cost caused by re-matching, wherein minimizing the cost caused by re-matching means maintaining the original matching relationship between the slab and the order as far as possible when re-matching slab;

wherein minimizing the overload means reducing the overload on the subsequent equipment unit;

step 5.3: quantitatively describing a process constraint of the slab re-matching:

1) constraint of production process: when re-matching slabs among the orders, only adjust the matching relationship, and removing a slab without allocating it to a new order is not allowed;

2) constraint for capacity of subsequent unit: in a subsequent process for the slab, the weight of the slab allocated to the equipment unit should reach the minimum processing capacity of the equipment unit;

3) constraint for quantity demanded: the total weight of slab allocated to the order should be within the range of slab weight required by the order, and the redundant weight should not exceed the weight of any slab allocated to the order;

step 6: with respect to information of the slab and order of each group of matched order, based on the matching condition of the slab and the order in step 2 and the slab re-matching described quantitatively in step 5, adjusting all the matching relationships of the slabs and the orders to form a final scheme of slab matching;

step 7: distributing the final scheme of slab matching to the multiple hot rolling lines and the slab matching is completed.

Advantageous Effects

In order to address the problems such as too many mis-order slabs and low utilization of slabs in the steel plant, the present invention provides a method of mis-order slab matching and slab re-matching to improve the material resource utilization of multiple hot rolling lines in steel plant, which improves the utilization of the slabs while reducing the waste of energy caused by repeated steelmaking, reducing the consumption of the material and lowers the amount of left material and stored material and saves production cost and storage cost for the plant. In order to address the adjustment problem for matching relationship of slab and order, the slabs can be matched to the orders in an optimized way, efficiently improving the accomplishment of the orders and reducing the left material and the cut loss, and guaranteeing the in time delivery for urgent orders and improving the satisfaction of the customers.

DETAILED DESCRIPTION OF EMBODIMENTS OF THE INVENTION

Figure 1:
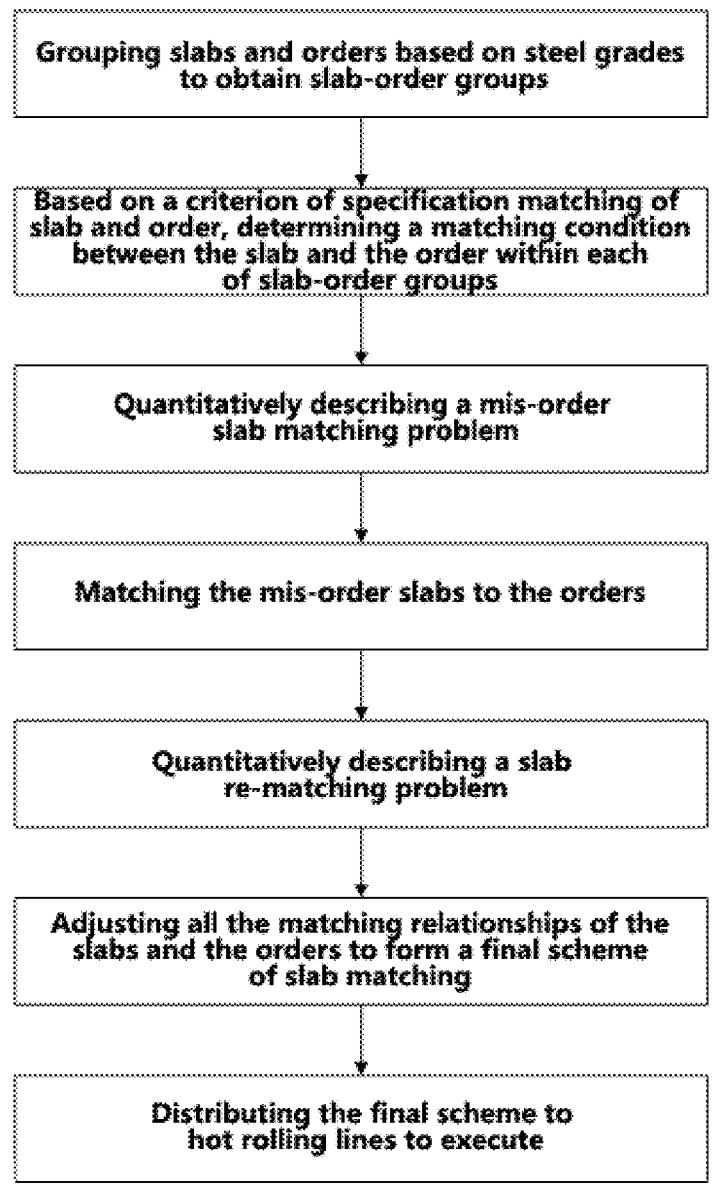
FIG. 1 is a flow diagram of a slab matching method for multiple hot rolling lines to improve material resource utilization according to an embodiment of the present invention.

An embodiment of the present invention will be detailed below in conjunction with the drawings.

The implementation of the present embodiment needs the following hardware systems: as least one PC; at least one optical cable or electric cable interface; and at least one router. These devices constitute a small LAN which then is connected to an enterprise ERP system (the ERP system refers to a management platform which is built on the basis of information technology with a systematic thinking of management, and provides decision-making means for decision-makers and staff). In the PC, Microsoft SQL Server 2000 database system is installed, and the server address, server port, database name, user name and password of the hardware system are set.

Data about slab and order is downloaded, and the fields of downloaded information about slab comprise the No. of slab, the No. of the original order (for a mis-order slab, the No. of the original order is empty), the time of being cut, the length of slab, the thickness of slab, the width of slab, the width of head of slab, the width of end of slab, the weight of slab, process flow of slab, the status of slab, the storage location of slab, error code, material group, sign of the produced steel, the No. of plan of changing storage location, the No. of plan of cutting, material of slab, sign of outsourcing; information of order comprises: No. of order, No. of BACKLOG (unfulfilled order), sign of the produced steel, status of order, nature of order, slab weight required by order, upper limit of tolerance of required slab weight, lower limit of tolerance of required slab weight, upper limit of weight of finished product, lower limit of weight of finished product, due date in factory, delivery date in order, rated thickness in rolling, material lack for application, material lack for rolling, upper limit of width of slab, lower limit of width of slab, upper limit of length of slab, lower limit of length of slab, lower limit of weight of slab, upper limit of weight of slab, material group, process flow of hot rolled steel coil, batch code, width of finished product plate/coil, quantity of slab in stock for steelmaking process, quantity of slab in stock for hot rolling process, charging coefficient for hot rolling, table of compositions in order, and sign of outsourcing. These data are automatically generated by the enterprise ERP system, and are stored in a specified FTP server in the form of text. A download command is executed, i.e., the data stored in the form of text is downloaded into the local computer by using FTP command, then the information in the text file is read into a data table of SQL Server 2000 database by using an SQL statement, and the successfully downloaded slab and order information is displayed; and, after the completion of the data download, the managements of the data of the existing mis-order slabs, allocated slabs and orders are conducted through data query and management functions, including such functions on data as adding, deleting, modifying, querying and exporting, etc. Parameters, including data source selection (conditions of orders and slabs that can be considered in the matching decision and conditions of orders and slabs that cannot be considered in the matching decision), priority setting (including order priority and slab priority), matching cost setting (by the difference between the specification of the slab and the specification required by its allocated order), are set according to practical needs.

Slab matching method for multiple hot rolling lines of a steel plant to improve material resource utilization, comprising the following steps:

step 1: grouping the slabs and orders based on steel grades to obtain slab-order groups;

wherein the slabs comprise all the mis-order slabs and the slabs already matched to the orders;

step 1.1: grouping steel grades according to better-substituting-relation (BSR) of steel grades: first, selecting a steel grade randomly, combining the steel grade with the steel grades having a BSR therewith into one steel grade group, and if there is no BSR between the steel grade and the other steel grades, then taking the steel grade solely as one steel grade group; comparing ungrouped steel grades with all the formed steel grade groups in a random order, and if there is a BSR between an ungrouped steel grade and the steel grade in a certain steel grade group, then adding the ungrouped steel grade into the certain steel grade group, otherwise taking the ungrouped steel grade solely as one steel grade group until all steel grades are assigned into steel grade groups;

wherein the better-substituting-relation (BSR) of steel grades means that when matching the slabs, a steel grade can be substituted with another steel grade;

step 1.2: if the steel grade of a slab and the steel grade required by an order belong to a same steel grade group, then assigning the slab and the order into the steel grade group;

All slabs and orders which belong to the same steel grade group form the slab-order group.

step 2: Based on a criterion of specification matching of slab and order, determining a matching condition between the slabs and the orders within each of slab-order groups, i.e., determining whether a given slab can be allocated to a given order, and if the slab and the order in the slab-order group satisfy the criterion, then the slab and the order can be matched and can constitute a slab-order pair, otherwise, the slab and the order cannot be matched;

wherein the criterion of specification matching of slab and order is as follows:

1) when the steel grade of a slab is the same as the steel grade required by an order or there exists a BSR between the steel grade of the slab and the steel grade required by the order, it is considered that the steel grade of the slab matches the steel grade of the order;

2) when the width of a slab falls in the width range of the slab required by an order, it is considered that the width of the slab matches the width of the order;

3) when the weight of a slab falls in the weight range of the slab required by an order, it is considered that the weight of the slab matches the weight of the order;

4) when the length of a slab falls in the length range of the slab required by an order, it is considered that the length of the slab matches the length of the order; and 5) each order has a specified hot-rolling production line, the slab allocated to the order needs to be subject to a coiling operation in a coiler specified by the order, the weight of the slab cannot exceed a weight limit of the coiler, and when the weight of the slab is less than the weight limit of the coiler specified by the order, it is considered that the weight of the slab matches a limit weight of the order;

step 3: quantitatively describing a mis-order slab matching problem;

step 3.1: selecting a decision variable $x_{kijl}$ for mis-order slab matching;

the decision variable $x_{kijl}$ represents a matching condition between a slab i located in a slab yard k and an order j needed to be processed on hot rolling line l, wherein when the slab i in the slab yard k is allocated to the order j of the hot rolling line l, the variable is assigned a value of 1; otherwise it is assigned a value of 0;

step 3.2: quantitatively describing the object for mis-order slab matching;

the object for mis-order slab matching comprises: minimizing the matching cost caused by the difference between the specification of the slab and the specification required by its allocated order, minimizing the cost caused by unallocated slabs, maximizing the priority profits of the slab and the order, and minimizing the cost caused by unfulfilled order;

wherein 1) minimizing the matching cost caused by the difference between the specification of the slab and the specification required by its allocated order the matching cost caused by the difference includes: the cost caused by quality difference when allocating a slab with a high quality to an order having a low quality requirement; the cost caused by specification mismatch when the specification of the slab cannot be matched with the specification required by the order; and the logistics cost when matching the slabs to orders of different hot rolling lines;

the cost caused by specification difference includes the cost caused by width difference when the width of the slab could not fall in the width range required by the order, the cost caused by weight difference when the weight of the slab could not fall in the weight range required by the order, and the cost caused by length difference when the length of the slab could not fall in the length range required by the order;

by describing quantitatively the above mentioned cost caused by specification difference by using a mathematical expression, minimized matching cost caused by specification difference is derived:

$$\min \sum_{j \in M} \sum_{i \in M} \sum_{k \in K_i} \sum_{l \in L_j} c_{ij} x_{kijl} \qquad (1)$$

wherein M means the set of all the orders, N means the set of all the mis-order slabs, $K_i$ means the set of storage areas where slab i is located, $L_j$ means the set of hot rolling lines that the order j requires, and $c_{ij}$ means the matching cost caused by the difference when slab i is matched to order j:

$$c_{ij} = w_1 c_{1ij} + w_2 c_{2ij} + w_3 c_{3ij} + w_4 c_{4ij} + w_5 c_{5ij} \qquad (2)$$

wherein:

$w_1, w_2, w_3, w_4, w_5$ are respectively the contribution factor of the matching cost caused by the steel grade difference, the contribution factor of the matching cost caused by the width difference, the contribution factor of the matching cost caused by the weight difference, the contribution factor of the matching cost caused by the length difference, and the contribution factor of logistics cost to the matching cost;

$c_{1ij}$—the cost caused by quality difference between slab i and order j (better-substituting-relation (BSR), using a slab of a higher steel grade to substitute the current one), i.e., the matching cost caused by quality difference when a slab of a high steel grade is matched to an order having a low quality requirement; in case that a steel grade required by the order is not completely identical to the steel grade of the matched slab, a user can accept steel having a relatively close property but higher quality to fill in the lack of the order; however, using high quality steel may increase the cost of the enterprise, and therefore will generate a matching cost caused by quality difference when using a slab of a higher steel grade to replace the steel grade required by the order;

$c_{2ij}$—the matching cost caused by specification difference due to the width of the slab i different from the width required by the order, that is the matching cost caused by the width mismatch between the slab and the order's requirement; each order has a certain constraint on the width of the slab, and of course, the ideal condition is that the width of the slab is just in the range of the width required by the order. If the slab is relatively wide, it has to be subject to cutting when being allocated to the order, therefore, the cost caused by cutting and waste of material would be generated.

$c_{3ij}$—the matching cost caused by specification difference due to a length difference between the length of slab i and the length required by order j, that is the matching cost caused by the length mismatch between the slab and the order's requirement; similarly to the case of the width, the mismatch between the length of slab i and the length required by order j will cause material waste, and thus cause matching cost.

$c_{4ij}$—the matching cost caused by specification difference due to a weight difference between the weight of slab i and the weight required by order j, that is the matching cost caused by the weight mismatch between the slab and the order's requirement; similarly to the case of the width or length, if the weight of the slab goes beyond the weight range required by the order, it will cause over production and waste of material and thus generate a matching cost.

$c_{5ij}$—the logistics cost of transportation when allocating slab i to order j, that is the logistics cost of transportation when allocating a slab to an order whose required hot rolling line is different from the hot rolling line that the slab is stored in. Considering the process flow of the orders and the storage area where the slab is located, the enterprisers wish that the slabs can be processed with the minimized transportation cost. When matching a slab to the order that is required to be produced in another production line, the slab has to be transferred from one storage area to another, that is transferring the slab from the storage area where it is located to a storage area of the hot rolling line designated by the order thus causing the increase of the transportation cost and the lengthening of the production cycle. Therefore, besides considering the above cost, the transfer of the slab must be minimized which also helps shortening the production cycle.

(2) minimizing the cost caused by unallocated slabs matching the mis-order slabs as much as possible to the unfulfilled orders, reducing the unallocated slabs to improve material resource utilization and reduce the energy consumption due to repeated steelmaking;

the minimizing the cost caused by the unallocated slabs can be described quantitatively by using a mathematical expression:

$$\min \sum_{i \in N} \sum_{k \in K_i} b_i \left( 1 - \sum_{j \in M} \sum_{l \in L_j} x_{kijl} \right) \qquad (3)$$

where $b_i$ represents the cost of unallocated slab i.

3) maximizing the priority profits of the slabs and orders

When making a matching decision, there exists a priority difference between slabs, and the same is also true between the orders. The matching scheme should preferentially adopt the slabs with a high priority profit, and the slabs should also be preferentially allocated to the orders with a high priority profit, thus reducing cost of production and storage and shortening the production cycle;

according to the production batches of the orders, the process flow of the orders, the time margin, the status of the order and the class of the order, determining the priority profit of the orders and allocating the slabs to the orders having higher priority profits preferentially; and according to the storage time of the slabs and location in storage of the slabs, determining the priority profit of the slabs and preferentially allocating the slabs having higher priority profits;

the maximizing priority profits of slabs and orders will be described quantitatively by using a mathematical expression:

$$\max \sum_{j \in M} \sum_{i \in N} \sum_{k \in K_i} \sum_{l \in L_j} R_j x_{kijl} + \sum_{i \in N} \sum_{l \in M} \sum_{k \in K_i} \sum_{l \in L_j} P_i x_{kijl} \qquad (4)$$

wherein, $R_j$ is the priority profit for order j and five priority factors are taken into account: the batches of the orders, process flow of order, the time margin, the status and the type. As shown in the following expression:

$$R_j = R_{1j} + R_{2j} + R_{3j} + R_{4j} + R_{5j} \quad (5)$$

$R_{1j}$—a priority profit for the production batch of order j. In order to guarantee continuity of operation of equipment unit, preferentially same or similar orders are converged together for processing (i.e., batch production) as far as possible, which can reduce the switching cost of the equipment unit. Therefore, slabs should be first allocated to orders that need to be produced in batch, to ensure that such orders can be processed in time, and thus decreasing the switching cost of the equipment unit.

$R_{2j}$—a priority profit for the process flow of order j. In the practical production, the processing path (i.e., flow) of each order might be different. In the course of production, considering that the some subsequent equipment unit needs to be run continuously, the supply of material cannot be stopped and the unit cannot be stopped, and therefore, according to the requirement of the subsequent equipment unit, the slabs should be allocated preferentially to the orders which is required to be produced on such continuous subsequent equipment unit.

$R_{3j}$—a priority profit for the time margin of order j. The time margin of the order refers to a difference between the number of days of the current date from the delivery date required by the order and the number of days needed to complete the process of the order, i.e., the remaining time from date of order completion to the delivery date of order. In practical production, accidents might occur, resulting in delayed delivery of the order, and therefore, the order having a smaller time margin is more urgent than the order having a larger time margin, and needs to be allocated slabs to it preferentially.

$R_{4j}$—a priority profit for the status of order j. During the process of order, the order may have different statuses, and the status of order indicates the current processing stage of the order. In order to ease the pressure for storage and shorten the production cycle of the order, the slabs should be preferentially matched to the orders which have been put into production or those whose production is close to be finished.

$R_{5j}$—a priority profit for the class of order j. The orders can be generally classified into three classes such as ordinary-order (OC), important-order (IC) and very-important-order (VIC). When making a matching decision, the slabs should be allocated preferentially to the important-orders and very-important-orders.

Wherein $P_i$ is a priority profit for slab i, which mainly considers the storage time of the slab, and the location in storage of the slab. As shown in the following expressions:

$$P_i = P_{1i} + P_{2i} \quad (6)$$

$P_{1i}$—a priority profit for storage time of slab i. Too long time in storage of slab may increase the inventory level and the inventory cost. In order to reduce those slabs which have been stored in the storage for a long time, the priority profit for storage time of the slab is defined as proportional to the storage time, that is, those slabs which have been stored in storage for a long time may have a high priority profit for storage time.

$P_{2i}$—a priority profit for location in storage of slab i. The location in storage of slab can be related to the inventory of its storage location, inventory cost and logistics cost related therewith. If the inventory of the storage location of the slab is relatively large, then in order to reduce the inventory and avoid the accident of overloads, the slab will be assigned a relatively high priority profit for location in storage.

4) minimizing the cost caused by unfulfilled orders

A fulfilled order means that the quantity of the products is just equal to the quantity of products required by the order, without any lack (the total weight of products is lower than the required weight) or over (the total weight of products exceeds the required weight); when the lack occurs, the order is not fulfilled in which it could not start the delivery of the products, and the storage space is occupied by the finished products and the production cycle is lengthened, and the date of delivery is delayed, causing unsatisfactoriness of customers. When over occurs, the customer won't pay for the redundant part which becomes a burden for the steel plant and greatly decreases the profit of the plant.

The minimizing the cost caused by unfulfilled orders will be described quantitatively by using a mathematical expression, to obtain a minimum cost caused by unfulfilled orders:

$$\min \sum_{j \in M} (q_1 Lack_j + d_j Com_j) \quad (7)$$

and to obtain a minimum cost caused by over:

$$\min \sum_{j \in M} q_2 Over_j \quad (8)$$

wherein $Lack_j$ is the lack for order j; $Com_j$ represents whether an order is fulfilled or not; $Over_j$ is the over for order j; $q_1$ represents the unit punishment for total slab lack of slabs of the orders; $d_j$ represents the punishment for unfulfillment of order j; $q_2$ represents the unit punishment for slab over of orders. Let $A_j$ be slab lack of order j, $AL_j$ be the maximum slab lack of order j, $a_i$ be the weight of slab i, UW be the upper limit of punishment of the slab lack for the orders, and $AU_j$ be the maximum slab over of order j, then the slab lack of the order $Lack_j$, the fulfillment condition of the order $Com_j$, and the slab over of the order $Over_j$ are denoted as follows respectively:

$$Lack_j = \min\left\{\max\left(0, A_j - AL_j - \sum_{i \in N}\sum_{k \in K_i}\sum_{l \in L_j} a_i x_{kijl}\right), UW\right\} \quad (9)$$

$$Com_j = 1 - \text{sign}\left\{\sum_{i \in N}\sum_{k \in K_i}\sum_{l \in L_j} a_i x_{kijl} - A_j + AL_j\right\} \quad (10)$$

$$Over_j = \max\left\{0, \sum_{i \in N}\sum_{k \in K_i}\sum_{l \in L_j} a_i x_{kijl} - A_j - AU_j\right\} \quad (11)$$

wherein $\text{sign}\{*\}$ is a piecewise function, and when $*>0$, $\text{sign}\{*\}$ is equal to 1, otherwise $\text{sign}\{*\}$ is equal to 0.

By describing quantitatively the above object for mis-order slab matching, an object function of mis-order slab matching problem is obtained as follows:

$$\min Z = F_1 \sum_{j \in M}\sum_{i \in N}\sum_{k \in K_i}\sum_{l \in L_j} c_{ij} x_{kijl} + F_2 \sum_{i \in N}\sum_{k \in K_i} b_i \left(1 - \sum_{j \in M}\sum_{l \in L_j} x_{kijl}\right) - \quad (12)$$

-continued
$$F_3 \sum_{j \in M} \sum_{i \in N} \sum_{k \in K_i} \sum_{l \in L_j} R_j x_{kijl} - F_4 \sum_{i \in N} \sum_{l \in M} \sum_{k \in K_i} \sum_{l \in L_j} P_i x_{kijl} +$$

$$\sum_{j=1}^{M} [F_5(q_1 Lack_j + d_j Com_j) + F_5' q_2 Over_j]$$

wherein $F_1$ is a weight coefficient of the matching cost caused by the specification difference between slab and order's requirement in the object function, $F_2$ is a weight coefficient of the cost caused by unmatched slabs in the object function, $F_3$ is a weight coefficient of the priority profits of slab and order in the object function, $F_4$ is a weight coefficient of the priority profit for slab in the object function, $F_5$ is a weight coefficient of the lack and punishment for unfulfillment of unfulfilled orders in the object function, and $F_5'$ is a weight coefficient of the punishment for over in orders in the object function.

Step 3.3: quantitatively describing a process constraint of a designated scheme of mis-order slab matching:

(1) constraint of production process: each slab is only allowed to be allocated to one order at most; it is not allowed to cut one slab into several pieces to be allocated, and if the specification of the slab doesn't agree with that required by the order and the slab has to be subject to cutting, then after cutting, the part satisfying the order is to be allocated to the order, and the remaining part (i.e. cut-loss) is disposed as waste material and is not allowed to be subject to any matching. The above constraint of production process is expressed as the following expression:

$$\sum_{j \in M} \sum_{l \in L_j} x_{kijl} \leq 1 \quad i \in N, k \in K_i \quad (13)$$

(2) constraint of the quantity demanded by the order: the weight of the slabs allocated to an order should be within the range of the quantity demanded by the order, and the redundant weight should not exceed the weight of any slab matched to the order;

wherein the redundant weight is equal to the total weight of slabs allocated to the order minus the slab weight demanded by the order;

the constraint of the quantity demanded by the order is expressed as follows:

$$\sum_{i \in N} \sum_{k \in K_i} a_i x_{kijl} + (A_j^T - A_j) \leq A_j^{min} + \min_{i \in l, k \in K_i} \{a_i \mid x_{kijl} = 1\} j \in M, \quad (14)$$

$$l \in L_j$$

wherein $a_i$ is the weight of slab i, $A_j^T$ is the total slab weight required by order j, $A_j^{max}$ is the upper limit of the total slab weight that can be accepted by order j, and $A_j^{min}$ is the lower limit of the total slab weight that can be accepted by order j.

Figure 2:
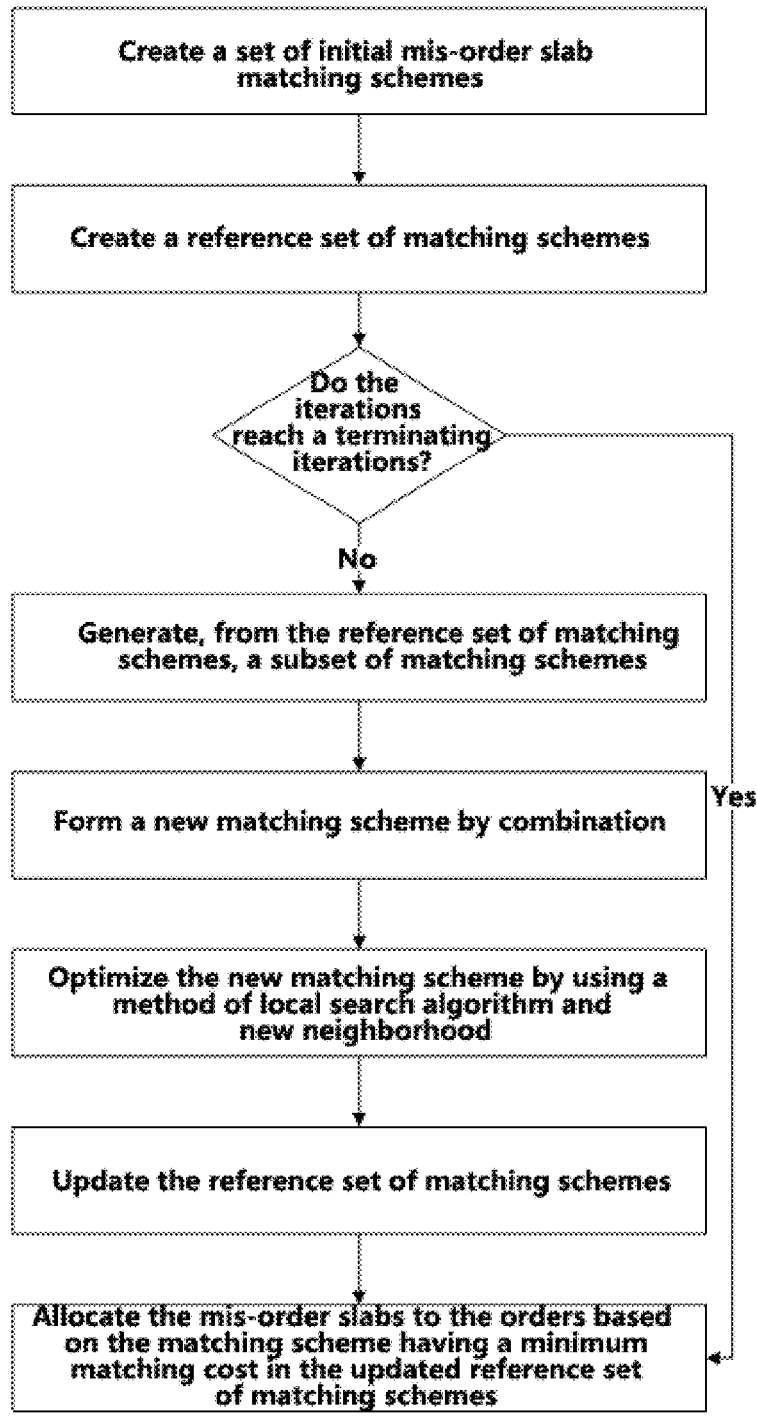
FIG. 2 is a flow chart of matching a mis-order slab to an order according to an embodiment of the present invention.
Figure 3:
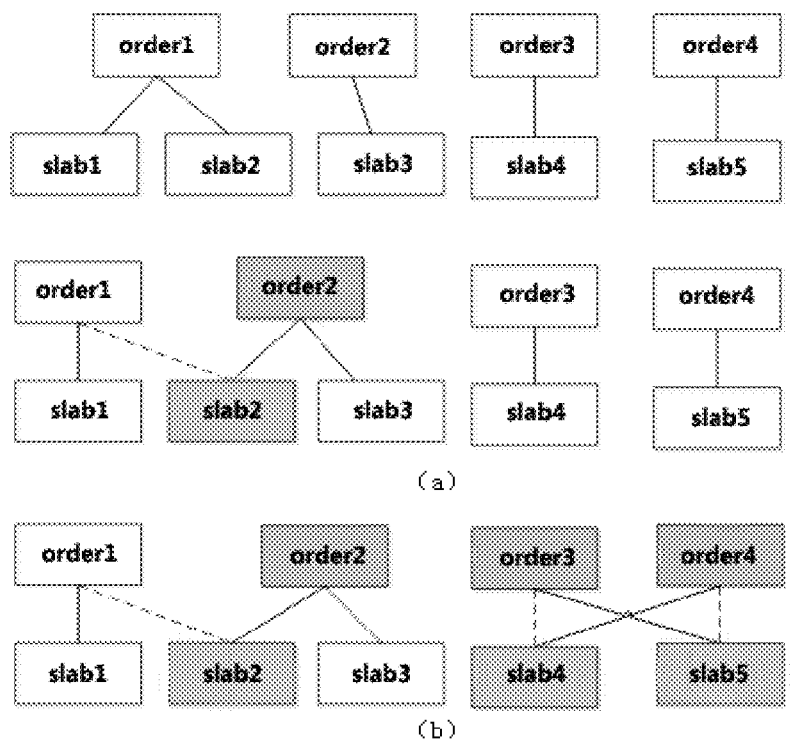
FIG. 3 is a schematic diagram of a searching neighborhood according to an embodiment of the present invention, where (a) is a searching neighborhood of one to one exchange, and (b) a searching neighborhood of m to m exchange.

Furthermore, the constraint of value of a decision variable:

$$X_{kijl} \in \{0,1\} \quad i \in N, j \in M, k \in K_i, l \in L_j \quad (15)$$

step 4: with respect to the information of the mis-order slabs and orders in each of slab-order groups, based on the matching condition between the slabs and the orders in step 2 and the mis-order slab matching problem quantitatively described in step 3, matching the mis-order slabs to the orders, as shown in FIG. 2;

step 4.1: creating a set (Pop) of initial mis-order slab matching schemes including matching schemes having a low matching cost and matching schemes having a good dispersity, the matching schemes having a good dispersity referring to matching schemes having a largest difference from the matching schemes having a low matching cost;

Suppose that the number of matching schemes included in the set of initial matching schemes (i.e., the size of the set) is Popsize. PopSize initial matching schemes are generated as the set of initial matching schemes by using greedy heuristic algorithm in a random manner. If the number of the generated matching schemes is less than PopSize since the data amount about the slab and orders is too small, then an improvement of neighborhood exchange is performed on the original matching schemes to get the new initial matching schemes;

Aiming at minimizing the matching cost caused by the difference between the specification of the slab and the specification required by its allocated order, building the set of initial mis-order slab matching schemes with different greedy heuristic algorithms;

heuristic algorithm 1: using the number of the slabs having a matching condition with the orders and the matching cost caused by the difference between the specification of the slab and the specification required by its allocated order, selecting the slabs and their matched orders, that is, sequencing all the slab-order pairs in an ascending sequence according to the number of slabs having a matching condition with the orders, and sequencing the slab-order pairs with the slabs that are corresponding to the same order in an ascending sequence according to the matching cost caused by the difference between the specification of the slab and the specification required by its allocated order, and then under the condition of meeting the processing requirements, starting from the first slab-order pair, selecting the slab-order pairs in which the orders are unfulfilled, allocating the slab in the slab-order pair to the order in the slab-order pair, and then allocating the left slabs in the same way until all the slabs are examined, that is the matching scheme 1;

heuristic algorithm 2: selecting the slab-order pairs by minimizing the matching cost caused by the difference between the specification of the slab and the specification required by its allocated order, that is sequencing the slab-order pairs in an ascending sequence according to the matching cost caused by the difference between the specification of the slab and the specification required by its allocated order, and starting from the first slab-order pair, under the condition of meeting the processing requirements, allocating the slab in the slab-order pair to the order in the slab-order pair, and then the next until all the slabs are examined, that is the matching scheme 2;

heuristic algorithm 3: selecting the slab-order pairs by utilizing the priorities of the orders, that is sequencing all the slab-order pairs in a descending sequence according to the priorities of the orders, and sequencing the slab-order pairs with the slabs corresponding to a same order in an ascending sequence according to the matching cost caused by the difference between the specification of the slab and the specification required by its allocated order, and starting from the first slab-order pair, under the condition of meeting the processing constraints, allocating the slab in the slab-order pair to the order in the slab-order pair, that is the matching scheme 3;

heuristic algorithm 4: selecting the slab-order pairs by using the priorities of the slabs, that is sequencing all the slab-order pairs in a descending sequence according to the priorities of the slabs, and sequencing the slab-order pairs with the orders corresponding to a same slab in an ascending sequence according to the matching cost caused by the difference between the specification of the slab and the specification required by its allocated order, and starting from the first slab-order pair, under the condition of meeting the processing constraints, allocating the slab in the slab-order pair to the order in the slab-order pair, that is the matching scheme 4;

heuristic algorithm 5: selecting the slab-order pairs by minimizing the matching cost caused by the difference between the specification of the slab and the specification required by its allocated order, that is sequencing all the slab-order pairs in an ascending sequence according to the matching cost caused by the difference between the specification of the slab and the specification required by its allocated order, and sequencing the slab-order pairs with a same matching cost in an descending sequence according to the priorities of the orders, and starting from the first slab-order pair, under the condition of meeting the processing constraints, allocating the slab in the slab-order pair to the order in the slab-pair, that is the matching scheme 5;

heuristic algorithm 6: selecting the slab-order pairs by minimizing the matching cost caused by the difference between the specification of the slab and the specification required by its allocated order, that is sequencing all the slab-order pairs in an ascending sequence according to the matching cost caused by the difference between the specification of the slab and the specification required by its allocated order, and sequencing the slab-order pairs with a same matching cost in a descending sequence according to the priorities of the orders, and starting from the first slab-order pair, under the condition of meeting the processing constraints, allocating the slab in the slab-order pair to the order in the slab-order pair, that is the matching scheme 6;

heuristic algorithm 7: selecting the slab-order pairs by using the priorities of the orders and the priorities of the slabs, that is sequencing all the slab-order pairs in a descending sequence according to the priorities of the orders and sequencing the slab-order pair with slabs of the same priority of order in a descending sequence according to the priorities of the slabs, and starting from the first slab-order pair, under the condition of meeting the processing constraints, allocating the slab in the slab-order pair to the order in the slab-order pair, that is the matching scheme 7;

step 4.2: creating a reference set of matching schemes;

according to the object of step 3.2, selecting N1 matching schemes having a low matching cost and N2 matching schemes having a good dispersity from the set of initial slab matching schemes to constitute a reference set of matching schemes; wherein the matching cost is determined according to the calculation of the object function (12), and a lower matching cost means a higher matching quality;

step 4.3: determination of a terminating condition: if iterations of step 4.2 reach a terminating iterations, then executing step 4.7, otherwise executing step 4.4;

step 4.4: generating, from the reference set of matching schemes, a subset of matching schemes, i.e., a matching scheme having a low matching cost and any two matching schemes in the reference set of matching schemes constitute a subset of matching schemes;

step 4.5: forming a new matching scheme by combination: recombining the matching schemes in the subset of matching schemes to generate a new matching scheme;

The new matching scheme contains some of good properties of matching schemes in the subset of matching schemes. During the recombination, the feasibility determination and recovery process are required for the matching schemes, and the generated new matching schemes have to meet the constraints (13)~(15).

step 4.6: optimizing the new matching scheme by using a method of local search algorithm and new neighborhood: exchanging the matching relationships between some slabs in the matching scheme to improve the new matching scheme;

step 4.7: updating the reference set of matching schemes: if the matching cost of the new matching scheme is lower than that of a matching scheme in the reference set of matching schemes, then using the new matching scheme to replace the original matching scheme in the reference set and executing step 4.4; otherwise, if no new matching scheme is generated, then regenerating N2 new matching schemes having a good dispersity and adding thereto N1 matching schemes having a low matching cost in the original reference set of matching schemes to serve as the set of initial matching schemes, and turning to step 4.2; if it is unable to generate a new matching scheme required by the set of initial matching schemes, then executing step 4.8;

step 4.8: allocating the mis-order slabs to the orders based on the matching scheme having a minimum matching cost in the updated reference set of matching schemes;

step 5: quantitatively describing a slab re-matching problem;

Here, the problem is complicated and its scale is relatively large, and the quality of the matching schemes cannot be improved quickly enough by using traditional neighborhood, thus a new neighborhood is proposed. As shown in FIG. 3, traditional neighborhood is mainly about 1 to 1 exchange which only adjusts the matching relationship of only one slab as shown in FIG. 3(a); and differently from traditional neighborhood, the neighborhood of the present invention is m to m exchange, that is to adjust matching relationships of multiple slabs in the matching scheme, thus obtaining a set of new matching schemes, and m is the number of slabs exchanged, as shown in FIG. 3(b). In this way, the quality of matching schemes is improved in a greater extent, thus may achieve global optimality, not local optimality.

Step 5.1: selecting a decision variable $x_{kijl}$ describing a matching relationship between a slab and an order, which represents a matching relationship between a slab i located in a slab yard k and an order j needed to be processed on a production line l, wherein when the slab i in the slab yard k is allocated to the order j of the hot rolling line l, the decision variable is assigned a value of 1; otherwise it is assigned a value of 0;

step 5.2: quantitatively describing an object for the slab re-matching comprising minimizing a matching cost caused by the difference between the specification of the slab and the specification required by its allocated order, maximizing the priority of order, minimizing the cost caused by unfulfilled order and minimizing the overload of equipment unit;

1) wherein minimizing a matching cost caused by the difference between the specification of the slab and the specification required by its allocated order means minimizing a matching cost caused by the quality difference, minimizing a matching cost caused by the specification difference, minimizing the logistics cost and minimizing the cost caused by re-matching, wherein minimizing the cost caused by re-matching means maintaining the original matching relationship between the slab and the order as far as possible when re-matching slab;

The minimizing a matching cost caused by the difference will be described quantitatively by using a mathematical expression:

$$\min \sum_{j \in M} \sum_{i \in N} \sum_{k \in K_i} \sum_{l \in L_j} c_{ij} x_{kijl} \quad (16)$$

wherein M represents the set of all the orders, N represents the set of slabs which have been allocated to all the orders, $K_i$ represents the set of storage areas where slab i is located, $L_j$ represents the set of hot rolling lines that is required by order j, and $c_{ij}$ represents the matching cost caused by the difference when slab i is reallocated to order j, which is as shown specifically in the following expression:

$$c_{ij} = w_1 c_{1ij} + w_2 c_{2ij} + w_3 c_{3ij} + w_4 c_{4ij} + w_5 c_{5ij} + w_6 c_{6ij}$$

wherein the definitions of $w_1$, $w_2$, $w_3$, $w_4$, $w_5$, $c_{1ij}$, $c_{2ij}$, $c_{3ij}$, $c_{4ij}$ and $c_{5ij}$ are consistent with the mis-order slab matching problem. $w_6$ is a contribution factor of the matching cost caused by re-matching the slab to the order; and, $c_{6ij}$ is the matching cost caused by re-matching slab i to order j (i.e. slab i originally did not belong to order j, and slab i is reallocated to order j when making re-matching decision).

2) Maximizing a priority profit of a re-matching order

Maximizing a priority profit of a re-matching order will be described quantitatively by using a mathematical expression:

$$\max \sum_{j \in M} \sum_{i \in N} \sum_{k \in K_i} \sum_{l \in L_j} R_j x_{kijl} \quad (17)$$

wherein $R_j$ is the priority profit of order j;

$$R_j = R_{j1} + R_{j2} + R_{j3} + R_{j4} + R_{j5}$$

$R_{j1}$, $R_{j2}$, $R_{j3}$, $R_{j4}$ and $R_{j5}$ are consistent with the definition of the slab matching problem.

3) Minimizing the quantity of unfulfilled orders

In practical production, it is always desirable that the order can be accomplished continuously and completely, which may help to batch production and in time delivery. This object is described quantitatively by using a mathematical expression, that is the minimum punishment for unfulfilled orders:

$$\min \sum_{j \in M} d_j \operatorname{sign} \left\{ A_j - AL_j - \sum_{i \in N} \sum_{k \in K_i} \sum_{l \in L_j} a_{ij} x_{kijl} \right\} \quad (18)$$

wherein $A_j$ represents the slab lack of order j; $AL_j$ is the maximum slab lack of order j; $a_i$ is the weight of slab i; and $d_j$ represents the punishment for unfulfilled order.

4) minimizing the cost caused by unfulfilled orders

A fulfilled order means that the quantity of the products is just equal to the quantity of products required by the order, without any lack (the total weight of products is lower than the required weight) or over (the total weight of products exceeds the required weight); when the lack occurs, the order is not fulfilled in which it could not start the delivery of the products, and the storage space is occupied by the finished products and the production cycle is lengthened, and the date of delivery is delayed, causing unsatisfactoriness of customers. When over occurs, the customer won't pay for the redundant part which becomes a burden for the steel plant and greatly decreases the profit of the plant.

Minimizing the cost caused by unfulfilled order will be described quantitatively by using a mathematical expression, to obtain a minimum cost caused by unfulfilled order:

$$\min \sum_{j \in M} (q_1 Lack_j + d_j Com_j) \quad (19)$$

and to obtain a minimum cost caused by over of slab:

$$\min \sum_{j \in M} q_2 Over_j \quad (20)$$

$Lack_j$, $Com_j$, $Over_j$, $q_1$, $d_j$, $q_2$ are consistent with the definition of the slab matching problem.

5): minimizing the overload of the equipment unit;

When a slab is matched to an order, the slab is processed through the process flow required by the order. However, in the production process of the slab, some equipment units may have constraints for their capacity. If the slabs processed by a unit exceed its capacity, this unit is overloaded, causing congestions in production lines and lengthening the production cycle of the order and increasing the production cost. Therefore, the overload for the unit should be minimized. This object is described quantitatively in a mathematical expression:

$$\min \sum_{l \in L} \max \left\{ \sum_{j \in M_l} \sum_{i \in N} \sum_{k \in K_i} a_i x_{kijl} - T_l, 0 \right\} \quad (21)$$

wherein $T_l$ represents the threshold of the production capacity for unit l, and when the amount of slabs that are processed in the unit l exceeds this value, then unit l is overloaded; and $M_l$ represents the set of all the orders needed to be processed on unit l.

In summary, the object function of slab re-matching is represented as follows:

$$MinimizeZ = \quad (22)$$

$$F_1 \sum_{j \in M} \sum_{i \in N} \sum_{k \in K_i} \sum_{l \in L_j} c_{ij} x_{kijl} - F_2 \sum_{j \in M} \sum_{i \in N} \sum_{k \in K_i} \sum_{l \in L_j} R_j x_{kijl} + +$$

$$\sum_{j=1}^{M} [F_3 (q_1 Lack_j + d_j Com_j) + F_4 q_2 Over_j] +$$

$$F_5 \sum_{l \in L} \max \left\{ \sum_{j \in M_l} \sum_{i \in N} \sum_{k \in K_i} a_i x_{kijl} - T_l, 0 \right\}$$

wherein $F_1$ is a weight coefficient of the matching cost caused by the difference between the specification of the slab and the specification required by its allocated order; $F_2$ is a weight coefficient of the priority profit for order; $F_3$ is a punishment coefficient for unfulfilled orders; $F_4$ is a punishment coefficient for slab over of orders; and $F_5$ is a punishment coefficient for the overload of an equipment unit.

Step 5.3: quantitatively describing a process constraint of the slab re-matching:

1) constraint of production process: when re-matching slabs among the orders, only adjust the matching relationships, and removing a slab without allocating it to a new order is not allowed;

$$\sum_{j\in M}\sum_{l\in L_j} x_{kijl} = 1 \quad i \in N, k \in K_i \quad (23)$$

2) constraint for capacity of subsequent unit: in a subsequent process for the slab, the weight of the slab allocated to the equipment unit should reach the minimum processing capacity of the equipment unit; Taking the pickling line as example, the total slabs allocated to the orders needing pickling, should reach the minimum processing capability of the picking line.

The constraint for the production capacity of the subsequent unit is as follows:

$$\sum_{j\in M_l}\sum_{i\in N}\sum_{k\in K_i} a_i x_{kijl} \geq B_l \quad l \in L, \quad (24)$$

where, $B_l$ represents the lower limit of the production capacity corresponding to the unit l.

3) constraint for quantity demanded: the total weight of slab allocated to the order should be within the range of slab weight required by the order, and the redundant weight should not exceed the weight of any slab allocated to the order;

the mathematical expression for constraint for quantity demanded by order is:

$$\sum_{i\in N}\sum_{k\in K_i} a_{ij}x_{kijl} + (A_j^T - A_j) \leq A_j^{min} + \min_{i\in I, k\in K_i}\{a_i \mid x_{kijl} = 1\} j \in M, \quad (25)$$

$$l \in L_j$$

wherein $A_j^T$ represents the total slab weight required by order, and $A_j^{min}$ represents the lower limit of the slab weight that can be accepted by order j.

In addition, constraint of value of a decision variable:

$$x_{kijl} \in \{0,1\} \quad i \in N, j \in M, k \in K_i, l \in L_j \quad (26)$$

In the slab re-matching, the matching cost of the matching scheme is calculated through expression (22); when a new matching scheme is generated, constraints (23)~(26) must be satisfied.

Step 6: with respect to information of the slab and order of each group of matched order, based on the matching condition of the slab and the order in step 2 and the slab re-matching described quantitatively in step 5, adjusting all the matching relationships of the slabs and the orders to form a final scheme of slab matching;

Step 7: distributing the final scheme of slab matching to the multiple hot rolling lines and the slab matching is completed.

Here is an example of practical production data of continuous 7 months in a large steel plant, the production data including data on slabs and data on orders. The comparison of results of the slab matching by conventional manual way and the slab matching of the present invention, is as follows:

TABLE 1

Comparison Of Results Of Manual Way (M) And Way Of The Present Invention (A) (every day)

| Month | Occurrence of mis-order slab | Quantity of mis-order slabs | Total weight of allocated mis-order slabs | | Quantity of redundant material | | Quantity of cut-loss (t) | | Number of fulfilled orders | | Number of urgent fulfilled orders | |
|---|---|---|---|---|---|---|---|---|---|---|---|---|
| | | | M | A | M | A | M | A | M | A | M | A |
| 3 | 1241 | 30825.2 | 6575.4 | 6687.1 | 655.4 | 371.3 | 70.26 | 44.73 | 98 | 111 | 40 | 45 |
| 4 | 1178 | 29548.8 | 7381.8 | 7451.6 | 602.7 | 297.8 | 60.41 | 41.17 | 106 | 123 | 34 | 40 |
| 5 | 1104 | 27333.9 | 7983.7 | 8054.8 | 645.1 | 338.4 | 67.46 | 40.61 | 111 | 132 | 41 | 47 |
| 6 | 1164 | 29057.4 | 8631.4 | 8734.2 | 794.2 | 431.8 | 54.31 | 39.11 | 125 | 147 | 39 | 41 |
| 7 | 1196 | 29947.3 | 6637.9 | 6746.9 | 616.4 | 373.6 | 56.92 | 41.82 | 89 | 115 | 26 | 30 |
| 8 | 1236 | 30917.6 | 7182.1 | 7301.4 | 611.6 | 331.5 | 55.93 | 39.34 | 123 | 137 | 62 | 68 |
| 9 | 1243 | 31075.1 | 8623.5 | 8725.8 | 768.7 | 445.9 | 71.59 | 47.01 | 142 | 160 | 71 | 82 |
| 10 | 1920 | 47145.3 | 8657.4 | 8779.1 | 757.2 | 424.1 | 62.13 | 44.41 | 172 | 189 | 84 | 91 |
| Average | 1285 | 31981.3 | 7709.1 | 7810.1 | 681.4 | 376.8 | 62.37 | 42.27 | 120 | 139 | 49 | 55 |

What is claimed is:

1. A slab matching method for multiple hot rolling lines of a steel plant to improve a material resource utilization, the method comprising:

step 1: grouping slabs and orders based on steel grades to obtain slab-order groups;

step 2: based on a criterion of specification matching of slab and order, determining a matching condition between the slabs and the orders within each of slab-order groups;

wherein the criterion of specification matching of slab and order is as follows:

1) when a steel grade of a slab is identical to a steel grade required by an order or there exists a better-substituting-relation (BSR) between the steel grade of the slab and the steel grade required by the order, it is considered that the steel grade of the slab matches the steel grade of the order;

2) when a width of a slab falls in a width range of a slab required by an order, it is considered that the width of the slab matches a width of the order;

3) when a weight of a slab falls in a weight range of a slab required by an order, it is considered that the weight of the slab matches a weight of the order;

4) when a length of a slab falls in a length range of a slab required by an order, it is considered that the length of the slab matches a length of the order; and 5) each order has a specified hot-rolling production line, the slab allocated to the order needs to be subject to a coiling operation in a coiler specified by the order, the weight of the slab cannot exceed a weight limit of the coiler, and when the weight of the slab is less than the weight limit of the coiler specified by the order, it is considered that the weight of the slab matches a limit weight of the order;

step 3: quantitatively describing a mis-order slab matching problem;

step 3-1: selecting a decision variable $X_{kijl}$ for mis-order slab matching;

the decision variable $x_{kijl}$ represents a matching relationship between a slab i located in a slab yard k and an order j needed to be processed on hot rolling line l, wherein when the slab i in the slab yard k is allocated to the order j of the hot rolling line l, the variable is assigned a value of 1; otherwise it is assigned a value of 0;

step 3-2: quantitatively describing the object for mis-order slab matching;

wherein the object for slab matching comprises: minimizing a matching cost caused by a difference between the specification of the slab and a specification required by its allocated order, minimizing a cost caused by unallocated slabs, maximizing priority profits of the slab and the order, and minimizing a cost caused by unfulfilled order;

wherein 1) minimizing the matching cost caused by the difference between the specification of the slab and the specification required by its allocated order includes:

minimizing a number of the slabs which are of high quality and allocated to the orders having a low quality requirement, thereby improving the suitability of the steel when fulfilling an order; minimizing a number of the slabs which have a specification mismatching a specification required by an order and are allocated to the order; and minimizing a number of the slabs which need to be transferred to another storage due to the slabs matched to orders of different hot rolling lines;

(2) minimizing the cost caused by unallocated slabs matching mis-order slabs as much as possible to unfulfilled orders, reducing the unallocated slabs to improve the material resource utilization and reduce energy consumption due to repeated steelmaking;

(3) maximizing the priority profits of the slab and the order according to production batches of the orders, a process flow of the orders, a time margin, a status of the order and a class of the order, determining the priority profit of the orders and allocating the slabs to the orders having higher priority profits preferentially; and according to a storage time of the slabs and a location in storage of the slabs, determining the priority profit of the slabs and preferentially allocating the slabs having higher priority profits;

(4) minimizing the cost caused by the unfulfilled order, wherein a fulfilled order means that the a quantity of the products is just equal to the quantity of products required by the order;

step 3-3: quantitatively describing process constraints of a designated scheme of mis-order slab matching:

(1) constraint of production process: each slab is only allowed to be allocated to one order at most;

(2) constraint of the quantity demanded by the order: the weight of the slabs allocated to an order should be within a range of the quantity demanded by the order, and a redundant weight should not exceed the weight of any slab matched to the order;

wherein the redundant weight is equal to the total weight of slabs allocated to the order minus the slab weight required by the order;

step 4: with respect to an information of the mis-order slabs and orders in each of slab-order groups, based on the matching condition between the slabs and the orders in the step 2 and the mis-order slab matching problem quantitatively described in the step 3, matching the mis-order slabs to the orders;

step 4-1: creating a set of initial mis-order slab matching schemes including matching schemes having a low matching cost and matching schemes having a good dispersity, the matching scheme having a good dispersity referring to matching schemes having a largest difference from the matching schemes having a low matching cost;

step 4-2: creating a reference set of matching schemes;

according to the object of the step 3-2, selecting N1 matching schemes having a low matching cost and N2 matching schemes having a good dispersity from the set of initial slab matching schemes to constitute a reference set of matching schemes;

step 4-3: determining whether iterations of the step 4-2 reaches a terminating iterations, executing step 4-7 if iterations of the step 4-2 reach a terminating iterations, and executing step 4-4 if iterations of the step 4-2 do not reach a terminating iterations;

step 4-4: generating, from the reference set of matching schemes, a subset of matching schemes, wherein a matching scheme having a low matching cost and any two matching schemes in the reference set of matching schemes constitute a subset of matching schemes;

step 4-5: forming a new matching scheme by combination: recombining the matching schemes in the subset of matching schemes to generate a new matching scheme;

step 4-6: optimizing the new matching scheme by using a method of local search algorithm and new neighborhood: exchanging matching relationships between some slabs in the matching scheme to improve the new matching scheme;

step 4-7: updating the reference set of matching schemes, including: if the matching cost of the new matching scheme is lower than a matching scheme in the reference set of matching schemes, then using the new matching scheme to replace an original matching scheme in the reference set and executing the step 4-4; if no new matching scheme is generated, then regenerating N2 new matching schemes having a good dispersity and combining the N2 new matching schemes with N1 matching schemes having a low matching cost in the original reference set of matching schemes to create the set of initial matching schemes, and executing the step 4-2;

step 4-8: allocating the mis-order slabs to the orders based on the matching scheme having a minimum matching cost in an updated reference set of matching schemes;

step 5: quantitatively describing a slab re-matching problem;

step 5-1: selecting a decision variable $x_{kijl}$ describing a matching relationship between a slab and an order, which represents a matching relationship between a slab i located in a slab yard k and an order j needed to be processed on a production line l, wherein when the slab i in the slab yard k is allocated to the order j of the hot rolling line l, the decision variable is assigned a value of 1; otherwise it is assigned a value of 0;

step 5-2: quantitatively describing an object for the slab re-matching comprising minimizing a matching cost caused by the difference between the specification of the slab and the specification required by its allocated order, maximizing the priority of order, minimizing the cost caused by unfulfilled order and minimizing an overload of equipment unit;

wherein minimizing a matching cost caused by the difference between the specification of the slab and the specification required by its allocated order means minimizing a matching cost caused by the quality difference, minimizing a matching cost caused by the specification difference, minimizing the logistics cost and minimizing the cost caused by re-matching, wherein minimizing a cost caused by re-matching means maintaining the original matching relationship between the slab and the order as far as possible when re-matching slab;

wherein minimizing the overload means reducing an overload on the subsequent equipment unit and operates to minimize a risk of accidents cause by overload of the subsequent equipment unit;

step 5-3: quantitatively describing a process constraint of the slab re-matching:

1) constraint of production process: when re-matching slabs among the orders, only adjust the matching relationships, and removing a slab without allocating it to a new order is not allowed;
2) constraint for capacity of subsequent unit: in a subsequent process for the slab, the weight of the slab allocated to the equipment unit should reach a minimum processing capacity of the equipment unit;
3) constraint for quantity demanded: the total weight of slab allocated to the order should be within the range of slab weight required by the order, and the redundant weight should not exceed the weight of any slab allocated to the order;

step 6: with respect to information of the slab and order of each group of matched order, based on the matching condition of the slab and the order in step 2 and the slab re-matching described quantitatively in step 5, adjusting all the matching relationships of the slabs and the orders to form a final scheme of slab matching;

step 7: distributing the final scheme of slab matching to the multiple hot rolling lines and the slab matching is completed; and Step 8: processing the slabs at the multiple hot rolling lines based on the final scheme of slab matching.

2. The method of claim 1, wherein the step 1 groups the slabs and orders based on steel grades to obtain slab-order groups and the slabs comprise all the mis-order slabs and the slabs already matched to the orders;

the step 1 specifically comprises the following:

step 1-1: grouping steel grades according to better-substituting-relation (BSR) of steel grades: first, selecting a steel grade randomly, combining the steel grade with the steel grades having a BSR therewith into one steel grade group, and if there is no BSR between the steel grade and other steel grades, then taking the steel grade solely as one steel grade group; comparing ungrouped steel grades with all formed steel grade groups in a random order, and if there is a BSR between an ungrouped steel grade and the steel grades in a certain steel grade group, then adding the ungrouped steel grade into the certain steel grade group, otherwise taking the ungrouped steel grade solely as one steel grade group until all steel grades are assigned into steel grade groups;

wherein the better-substituting-relation (BSR) of steel grades means that when matching the slabs, a steel grade can be substituted with another steel grade;

step 1-2: if the steel grade of the slab and the steel grade required by the order belong to a same steel grade group, then assigning the slab and the order into the steel grade group.

* * * * *